United States Patent [19]

Taguchi et al.

[11] 4,034,562

[45] July 12, 1977

[54] EXHAUST REACTION APPARATUS FOR INTERNAL COMBUSTION ENGINE HAVING IN-LINE CYLINDERS

[75] Inventors: Eiji Taguchi, Tokyo; Kenji Kimura, Wako, both of Japan

[73] Assignee: Honda Giken Kogyo Kabushiki Kaisha, Tokyo, Japan

[21] Appl. No.: 639,096

[22] Filed: Dec. 9, 1975

[30] Foreign Application Priority Data

Dec. 11, 1974  Japan .............................. 49-141525

[51] Int. Cl.² .......................................... F01N 3/10
[52] U.S. Cl. ................................. 60/282; 60/323
[58] Field of Search ................... 60/282, 323, 303; 23/277 C

[56] References Cited

U.S. PATENT DOCUMENTS

| | | | |
|---|---|---|---|
| 2,257,631 | 9/1941 | Wahlberg | 60/323 |
| 3,302,394 | 2/1967 | Pahnke | 60/282 |
| 3,633,368 | 1/1972 | Rosenlund | 60/282 |
| 3,704,592 | 12/1972 | Panhard | 60/303 |
| 3,839,862 | 10/1974 | Gota | 60/282 |

Primary Examiner—Douglas Hart
Attorney, Agent, or Firm—Lyon & Lyon

[57] ABSTRACT

An internal combustion engine having a plurality of in-line cylinders is provided with a series of exhaust pipes each connected to receive exhaust gases from one or more of the cylinders. A first reaction chamber receives exhaust gases from each of the exhaust pipes. A second reaction chamber extends along a first reaction chamber parallel with the line of cylinders, and has a wall in common with the first reaction chamber. A third reaction chamber surrounds and encloses the first and second reaction chambers and the exhaust pipes. An opening between the first and second reaction chambers is positioned near one of the exhaust pipes at the end of the series, and another opening between the second and third exhaust reaction chambers is positioned near an exhaust pipe at the other end of the series. This construction minimizes temperature drop in the long exhaust pipes at the ends of the series. Exhaust gases from the engine are held at high temperature for long residence time to oxidize HC and CO and thereby minimize discharge of these unwanted emissions into the atmosphere.

4 Claims, 2 Drawing Figures

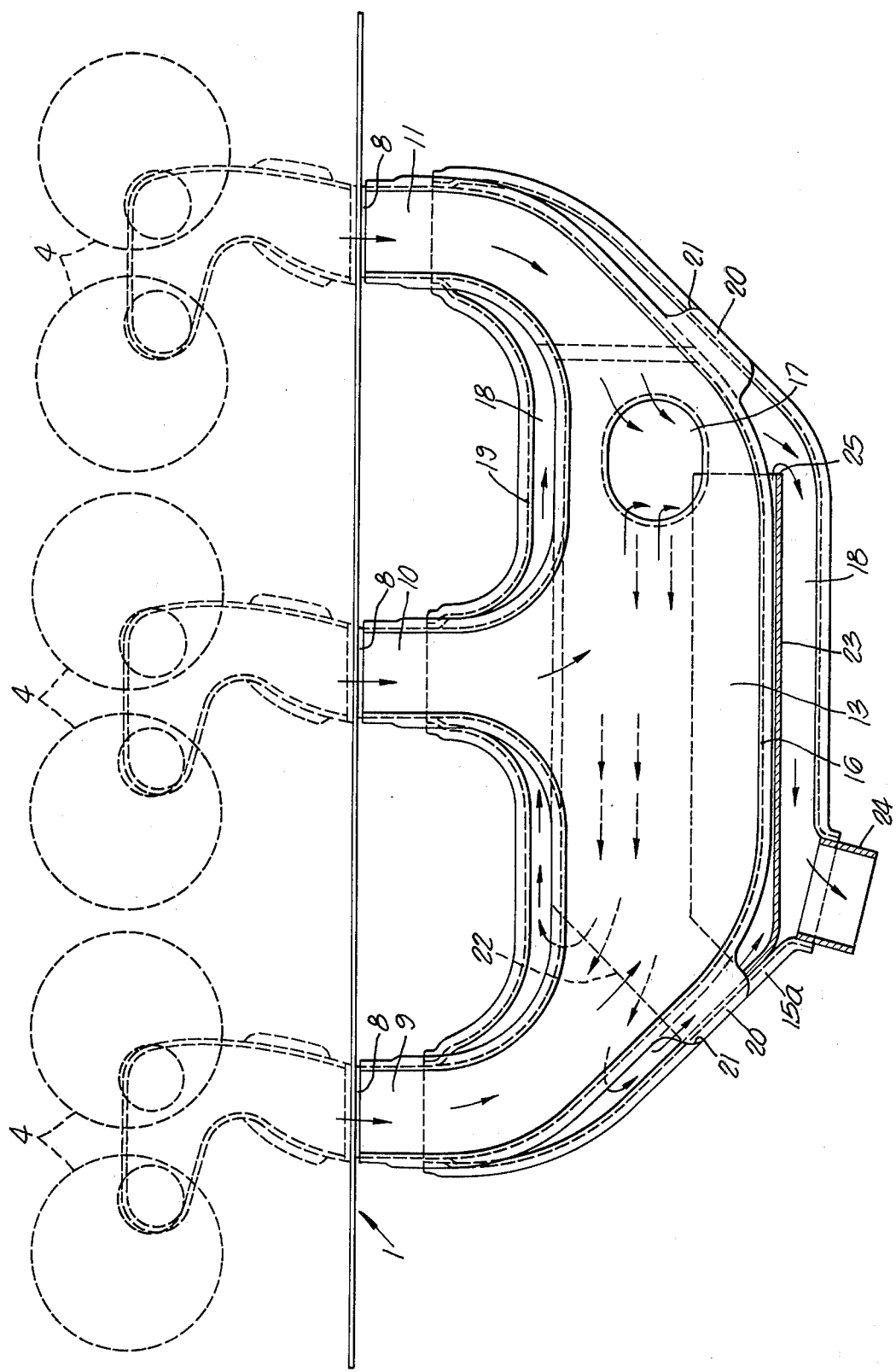

EXHAUST REACTION APPARATUS FOR INTERNAL COMBUSTION ENGINE HAVING IN-LINE CYLINDERS

This invention relates to exhaust emission control apparatus for internal combustion engines having in-line cylinders, and discharging exhaust gases. This invention is particularly directed to improved apparatus for maintaining such exhaust gases at high temperature for long residence time in order to more completely oxidize unwanted pollutants such as HC and CO.

Conventional engines having in-line cylinders have employed a series of exhaust pipes feeding exhaust gases into a common reaction chamber. However, those exhaust pipes that are on the ends of the series are longer in length than those elsewhere in the series, so that exhaust gas flowing through said longer exhaust pipes have greater temperature drop, with the result that the exhaust gas reaction is impaired, and discharge of unwanted pollutants occurs into the atmosphere.

In accordance with this invention, the foregoing shortcoming is overcome by means of exhaust gas reaction apparatus which prevents undesirable cooling of exhaust gases in the longer exhaust pipes. This is accomplished through the use of three exhaust gas reaction chambers, the first chamber receiving exhaust gases from all of the exhaust pipes, the second chamber lying adjacent the first chamber and sharing a common wall, and the third chamber surrounding and enclosing the first and second chambers and also surrounding and enclosing each of the exhaust pipes. An opening from the first reaction chamber to the second reaction chamber is placed near an exhaust pipe near one end of the series, and the opening from the second reaction chamber into the third reaction chamber is placed near an exhaust pipe at the other end of the series. The construction is such that the exhaust gases must take a tortuous path through all three exhaust reaction chambers before being discharged to the atmosphere. A thick wall housing surrounds the thin walls of the various reaction chambers, with an insulating air space therebetween.

Other and more detailed objects and advantages will appear hereinafter.

In the drawings:

FIG. 2 is a sectional view taken substantially on the lines 2—2 as shown on FIG. 1.

Figure 1:
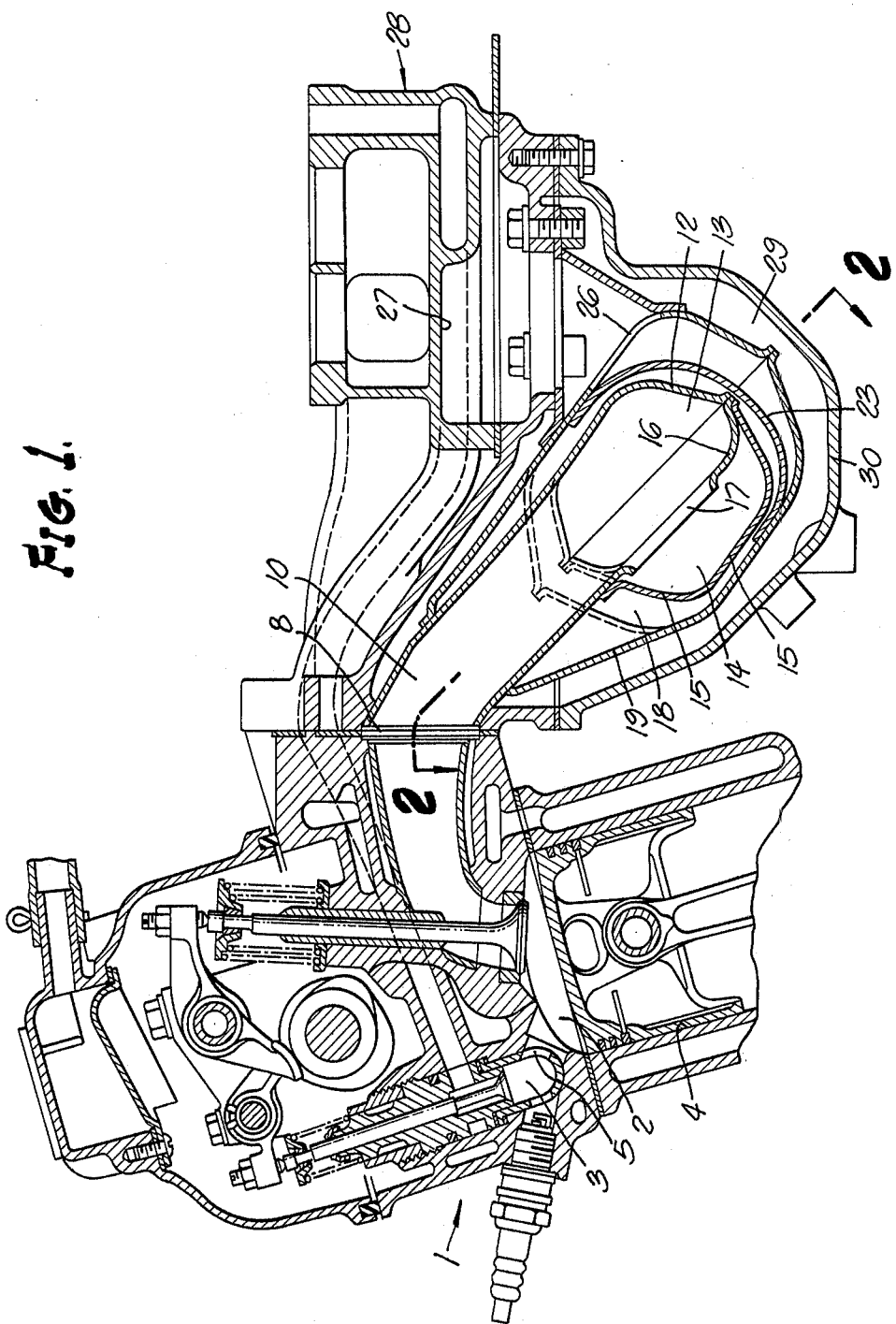
FIG. 1 is a sectional elevation showing a preferred embodiment of this invention.

Referring to the drawings, the internal combustion engine 1 has six cylinders in line, each cylinder 4 having a main combustion chamber 2 and an auxiliary combustion chamber 3 connected by a torch opening 5. The cylinders 4 are positioned in three groups, two to each group, and the exhaust passages from each group merge to form a single exhaust port 8. The three exhaust ports 8 thus formed are connected to three exhaust pipes 9, 10 and 11 arranged in a series, the exhaust pipes 9 and 11 at opposite ends of the series each being longer than the exhaust pipe 10.

Each of the exhaust pipes merges into thin walls 12 which define a first reaction chamber 13. A second reaction chamber 14 is defined within thin walls 15. This second reaction chamber 14 lies adjacent the first reaction chamber 13 and extends in a direction parallel to the line of cylinders 4. The first and second reaction chambers 13 and 14 have a common wall 16. An opening 17 in this common wall 16 is positioned near the long exhaust pipe 11 and serves to convey exhaust gases from the first reaction chamber 13 into the second reaction chamber 14.

A third reaction chamber 18 is formed within the thin wall shell 19 which surrounds and encloses the first and second reaction chambers 13 and 14 and all three of the exhaust pipes 9, 10 and 11. Protuberances 20 on the walls 12 are received within recesses 21 in the shell 19 to provide support for the walls 12 and 15 within the shell 19.

A second opening 22 is formed in one of the walls 15 near the exhaust pipe 9 and serves to convey exhaust gases from the second reaction chamber 14 into the third reaction chamber 18. The thin wall baffle 23 is positioned to prevent direct flow of exhaust gas from the opening 22 to the discharge pipe 24 and, instead, requires that the exhaust gases travel around the free end 25 of the baffle 23 before reversing direction to pass through the discharge pipe 24.

From the foregoing description it will be understood that exhaust gases carried by the exhaust pipes 9, 10 and 11 are delivered to the first reaction chamber 13 and then pass through opening 17 near the exhaust pipe 11 into the second reaction chamber 14. The direction of flow is then reversed so that the exhaust gases pass from right to left, as viewed in FIG. 2, to reach the opening 22. Exhaust gases passing through the opening 22 return toward the right and pass around the end 25 of the baffle 23 before again reversing direction in order to pass through the discharge pipe 24.

Temperature drop in the long exhaust pipes 9 and 11 is reduced to a minimum because of the surrounding shell 19 carrying exhaust gases from the first and second reaction chambers. Exhaust gases are then maintained at high temperature for long residence time and in this way discharge of unwanted pollutants HC and CO into the atmosphere is curtailed.

An opening 26 is formed in the shell 19 and positioned below the riser portion 27 of the intake manifold 28 so that exhaust gases may heat the incoming lean mixture for the main combustion chambers 2 and the incoming rich mixture for the auxiliary combustion chambers 3.

Heat dissipation from the shell 19 is reduced by the presence of the air space 29 within the thick wall housing 30 surrounding and enclosing the shell 19 and exhaust pipes 9, 10 and 11.

Having fully described our invention, it is to be understood that we are not to be limited to the details herein set forth but that our invention is of the full scope of the appended claims.

We claim:

1. For use with an internal combustion engine which discharges exhaust gases from a plurality of in-line cylinders, the improvement comprising, in combination: a series of exhaust pipes each having an inlet end connected to receive exhaust gases from at least one of the cylinders, respectively, walls forming a first reaction chamber connected to receive exhaust gases from each of said exhaust pipes, walls forming a second reaction chamber extending along the first reaction chamber in a direction parallel to the line of cylinders, walls forming a third reaction chamber surrounding and enclosing said first and second reaction chambers and surrounding and enclosing each of said exhaust pipes, the first reaction chamber having opening means near an exhaust pipe at one end of the series for discharging all of the exhaust gases from the first reaction chamber into the second reaction chamber, and the second reaction chamber having opening means near an exhaust pipe at the other end of the series for discharging all of the exhaust gases from the second reaction chamber into the third reaction chamber, a discharge pipe near said one end of the series, baffle means for leading all of the exhaust gases in the third reaction chamber to said discharge pipe.

2. The combination set forth in claim 1 in which the first and second reaction chambers have a common wall.

3. For use with an internal combustion engine which discharges exhaust gases from six in-line cylinders, the improvement comprising, in combination: a series of first, second and third exhaust pipes each having an inlet end connected to receive exhaust gases from two cylinders of different exhaust timing, the first and third exhaust pipes at opposite ends of the series having the same length and each being longer than the second exhaust pipe, walls forming a first reaction chamber connected to receive exhaust gases from each of said exhaust pipes, walls forming a second reaction chamber extending along the first reaction chamber in a direction parallel to the line of cylinders, walls forming a third reaction chamber surrounding and enclosing said first and second reaction chambers and surrounding and enclosing each of said exhaust pipes, the first reaction chamber having opening means near the third exhaust pipe for discharging all of the exhaust gases from the first reaction chamber into the second reaction chamber, and the second reaction chamber having opening means near the first exhaust pipe for discharging all of the exhaust gases from the second reaction chamber into the third reaction chamber, a discharge pipe near said one end of the series, baffle means for leading all of the exhaust gases in the third reaction chamber to said discharge pipe.

4. The combination set forth in claim 3 in which the first and second reaction chambers have a common wall.

* * * * *